United States Patent
Karale et al.

(10) Patent No.: US 10,422,206 B2
(45) Date of Patent: Sep. 24, 2019

(54) METHOD OF ACIDIZING OF SUBTERRANEAN FORMATIONS IN WELL OPERATIONS

(71) Applicant: Halliburton Energy Services, Inc., Houston, TX (US)

(72) Inventors: Chaitanya Millikarjun Karale, Pune (IN); Rajender Salla, Pune (IN); Ragi Lohidakshan Poyyara, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/542,329

(22) PCT Filed: Dec. 30, 2015

(86) PCT No.: PCT/US2015/067998
§ 371 (c)(1),
(2) Date: Jul. 7, 2017

(87) PCT Pub. No.: WO2016/126351
PCT Pub. Date: Aug. 11, 2016

(65) Prior Publication Data
US 2018/0274348 A1 Sep. 27, 2018

(30) Foreign Application Priority Data
Feb. 3, 2015 (IN) .............. 310/DEL/2015

(51) Int. Cl.
*E21B 43/24* (2006.01)
*E21B 43/26* (2006.01)
(Continued)

(52) U.S. Cl.
CPC .......... *E21B 43/2405* (2013.01); *C09K 8/601* (2013.01); *C09K 8/72* (2013.01);
(Continued)

(58) Field of Classification Search
None
See application file for complete search history.

(56) References Cited

U.S. PATENT DOCUMENTS 4,482,016 A * 11/1984 Richardson .............. C09K 8/72
166/300
4,770,796 A 9/1988 Jacobs
(Continued)

FOREIGN PATENT DOCUMENTS

WO 2014149970 9/2014

OTHER PUBLICATIONS

"Fluid Temperature as a Design Parameter in Carbonate Matrix Acidizing" by Kalia et al. Published in 2010.
(Continued)

*Primary Examiner* — Anuradha Ahuja
(74) *Attorney, Agent, or Firm* — Thomas Rooney; C. Tumey Law Group PLLC (57) ABSTRACT

A method for acidizing a subterranean formation is disclosed. The method includes using an acid to lower the pH of a fluid within a subterranean formation. The method further includes reacting exothermic reaction components in the fluid within the subterranean formation to heat the subterranean formation. The method additionally includes acidizing the subterranean formation.

17 Claims, 2 Drawing Sheets

(51) Int. Cl.
*C09K 8/60* (2006.01)
*C09K 8/72* (2006.01)
*C09K 8/92* (2006.01)
*E21B 21/00* (2006.01)

(52) U.S. Cl.
CPC ............... *C09K 8/725* (2013.01); *C09K 8/92* (2013.01); *E21B 43/26* (2013.01); *C09K 2208/32* (2013.01); *E21B 21/003* (2013.01)

(56) References Cited

U.S. PATENT DOCUMENTS

| | | |
|---|---|---|
| 2006/0081374 A1 | 4/2006 | Bland et al. |
| 2010/0252267 A1 | 10/2010 | Harris et al. |
| 2012/0164204 A1 | 6/2012 | Egger et al. |
| 2012/0305255 A1 | 12/2012 | Zavolzhskiy et al. |
| 2013/0126169 A1* | 5/2013 | Al-Nakhli ............... E21B 43/26 166/300 |
| 2013/0310285 A1 | 11/2013 | Fedorov et al. |
| 2014/0262249 A1* | 9/2014 | Willberg ............... E21B 43/247 166/251.1 |
| 2015/0000912 A1* | 1/2015 | Choudhary ........... E21B 36/008 166/300 |

OTHER PUBLICATIONS

International Search Report and Written Opinion for PCT/US2015/067998 dated Apr. 1, 2016.

* cited by examiner

METHOD OF ACIDIZING OF SUBTERRANEAN FORMATIONS IN WELL OPERATIONS

BACKGROUND

The present invention relates to a method of acidizing subterranean formations in well operations and, more particularly, to the use of a exothermic reaction to heat a subterranean formation in order to improve the acidization of the subterranean formation.

Acidic fluids may be present in a multitude of operations in the oil and chemical industries. Acidic fluids are often used as a treatment fluid in well operations. These acidic treatment fluids may be used in clean-up operations, stimulation operations, or other operations for oil and gas wells. Acidic stimulation operations may be used in hydraulic fracturing and matrix acidizing treatments. As used herein, the term "treatment fluid" refers to any fluid that may be used in an application in conjunction with a desired function and/or for a desired purpose. The term "treatment" does not imply any particular action by the fluid or any component thereof.

A common problem associated with using acidic treatment fluids in subterranean formations is that certain formation types, for example dolomite formations, may be difficult to acidize. For example, dolomite formations with low temperatures (e.g., temperatures of 200° F. or lower) may, in some instances, not be effectively acidized by application of an acidizing treatment fluid alone. These low temperature dolomite formations may require additional expenditures and time in order to be effectively acidized.

Assortments of alternatives have been developed to acidize dolomite formations at low temperatures. Some of these alternatives may include viscoelastic surfactants that, in certain circumstances, may gel and push the acidizing treatment fluid further into the formation which may increase the range in which the acidizing treatment fluid penetrates the formation. However, these viscoelastic surfactants may still require larger volumes to be pumped for effective acidization due to the retarded reaction rates.

BRIEF DESCRIPTION OF THE DRAWINGS

These drawings illustrate certain aspects of some of the embodiments of the present invention, and should not be used to limit or define the invention.

DETAILED DESCRIPTION

The present invention relates to acidizing subterranean formations and, more particularly, to the use of a exothermic reaction to heat a subterranean formation in order to improve the acidization of the subterranean formation.

There may be several potential advantages to the methods and compositions of the treatment fluids disclosed herein, only some of which may be alluded to herein. One of the many potential advantages is that formations having low temperatures (e.g., less than 200° F.) may be acidized efficiently where conventional acids fail. An additional advantage may be that formations with low reactivity (e.g., dolomite formations) may be acidized efficiently where conventional acid treatments fail. Further advantage may be that the efficient acidizing of a formation may result in higher production due to a faster acid reaction rate and therefor dissolution rate. Another potential advantage may be that the disclosed methods and systems are cost effective and may be implemented easily.

To increase the rate of an acidizing reaction, heat may be applied to the formation. The heat may be provided by an exothermic chemical reaction placed in the area where acidization is occurring, or is to occur. Distinct treatment fluids may be used to convey the acidizing component and the exothermic reaction components to the formation. The schedule of the treatment fluids may be altered as desired. For example, some examples may comprise a treatment fluid comprising an acid being placed in the target formation followed by a subsequent treatment fluid comprising the exothermic reaction components. In this example, the exothermic reaction components should not react until a threshold pH value is achieved. Therefore, the exothermic reaction components may not react until reaching the target formation, which comprises a pH below the threshold due to the presence of the acidizing component which was pumped to the target formation previously in a separate treatment fluid.

Without being limited by theory, dolomite formations at temperatures less than 200° F. (~93° C.) may have lower reactivity with conventional acid systems as compared to other formations, for example, limestone. Dolomite formations at low temperatures may require higher pore volumes (e.g., 40+ pore volumes at 25° C.) as compared to a limestone formation in order to wormhole breakthrough, this may be improved at higher temperatures, for example, at greater than 75° C. In some examples, the dolomite dissolution rate may be lower than that of limestone at low temperatures, however, the dissolution rate may increase to surpass that of limestone when the formation temperature is increased beyond 200° F.

The treatment fluids may comprise an acid. The acid may comprise organic acids, inorganic acids, derivatives thereof, or combinations thereof. Examples of suitable acids generally include any acid or fluid capable of dissolving carbonate. Specific examples may include, but are not limited to, hydrochloric acid, hydrofluoric acid, formic acid, lactic acid, phosphoric acid, sulfamic acid, acetic acid, esters of acids, acid sources, derivatives thereof, and mixtures thereof. Acid sources may be any precursor of an acid, for example, an aldehyde capable of being oxidized to form an acid. As will be appreciated by those of ordinary skill, with the benefit of this disclosure, acid-generating materials may also be used. The acid may be present in the treatment fluids in any suitable amount, including in an amount of from about 0.5% to about 40% by weight of the fluid. Alternatively, the acid may be present in the treatment fluids in an amount of from about 2.5% to about 28% by weight of the fluid. Alternatively, the acid may be present in the treatment fluids in an amount of from about 2.5% to about 15% by weight of the fluid. Individuals skilled in the art, with the benefit of this disclosure, should be able to select a suitable acid and a suitable concentration thereof for a chosen application. In some instances, the particular concentration used in any particular embodiment depends on what acid is being used, and what percentage of acid is present. Other complex, interrelated factors that may be considered in deciding how much of the acid compound to use include, but are not limited to, the composition of the formation, the temperature of the formation, permeability of the formation, the pressure of the formation, the particular fines in the formation, the particular acid used, metals the acid may contact, corrosion concerns, the expected contact time of the acid with the formation, etc.

As will be appreciated, the treatment fluids may be used in a variety of acidizing operations. The purpose of acidizing is to dissolve acid-soluble materials. A treatment fluid comprising an acid may be introduced into a subterranean formation by way of a wellbore to dissolve the acid-soluble materials. In this way, oil or gas can more easily flow from the formation into the wellbore. In addition, acidizing can facilitate the flow of injected treatment fluids from the well into the formation.

Acidizing operations may be carried out as acid fracturing procedures or matrix acidizing procedures. In acid fracturing, an acidic treatment fluid may be pumped into a formation at a sufficient pressure to cause fracturing of the formation and to create differential (non-uniform) etching of fracture conductivity. For example, an acidic treatment fluid comprising an aqueous component and an acid may be introduced into the formation to cause fracturing of the formation. Depending on the rock of the formation, the acidizing treatment fluid can etch the fractures faces, whereby flow channels may formed when the fractures close. The acidic treatment fluid may also enlarge the pore spaces in the fracture faces and in the formation. In matrix acidizing, the acidizing treatment fluid may be injected from the wellbore into the formation at a rate and pressure below the pressure sufficient to create a fracture in the formation.

The type of subterranean formation being treated with the acidic treatment fluids described herein is not believed to be particularly limited. The subterranean formation may comprise a carbonate formation, such as a limestone or dolomite formation, for example. The subterranean formation may comprise a siliceous formation or have had a siliceous material introduced thereto. Alternatively, the subterranean formation may comprise a sandstone formation or a clay-containing formation. Even further, the subterranean formation may comprise a subterranean formation having a low permeability, such as a shale formation, for example. Moreover, the subterranean formation may comprise native minerals such as, for example, authigenic or detrital minerals, particularly layered aluminosilicates, feldspathic minerals, or purely siliceous minerals.

As discussed above, the formation may be any type of formation comprising any type of formation properties. The examples described herein may be particularly suited for dolomite formations with low temperatures, for example, formations with bottom hole static temperatures below 200° F.

As discussed above, a separate exothermic reaction may be used to heat the formation before and/or during the acidization process in order to improve the reaction rate of the acidization reaction. The exothermic reaction may comprise sodium nitrite ($NaNO_2$) and ammonium chloride ($NH_4Cl$) which, when exposed to a pH of 4 or less, may react in an exothermic reaction to generate a large amount of heat (e.g., $\Delta H=-334.2$ kJ/mol at 25° C.). The large exotherm produced by the reaction may be used to heat the subterranean formation to temperatures which may exceed 200° F. The increased heat within the formation may also increase the rate of any concurrent acidization reaction occurring within the formation. The reaction of $NaNO_2$ and $NH_4Cl$ is illustrated by equation 1 below:

Eq. 1

Although, the exothermic reaction described in the disclosed examples comprises the reaction of sodium nitrite and ammonium chloride, the invention contemplates the use of any other exothermic reaction that produces a large amount of heat and is compatible with wellbore conditions and the subterranean formation.

The components of the exothermic reaction (e.g., $NaNO_2$ and $NH_4Cl$) may be included in a treatment fluid The components may be individually included in a treatment fluid in a concentration between about 0.01 molar to about 7 molar. For example, the components may comprise a concentration between about 0.1 molar to about 4.5 molar. The components may be included in the same treatment fluid or may be included in distinct treatment fluids. In some examples one of the components may be included in a treatment fluid with an acid. For example, the treatment fluid may be pumped to a target location where the acid decreases the pH of the formation to less than 4. The second component may then be pumped in a subsequent treatment fluid to the target location where it reacts with the first component in the presence of the acid to generate an exotherm capable of increasing the formation temperature. The increased formation temperature increases the rate of acidization of the formation.

As discussed, the exothermic reaction may necessitate adding an acid to a subterranean formation to decrease the pH of the exothermic reaction components to a pH sufficiently low to initiate the subsequent exothermic reaction (e.g., a pH of 4 or less for the reaction of $NaNO_2$ and $NH_4Cl$). For some exothermic reaction components, a specific pH threshold must be met to induce the reaction. The threshold may be met through contact with an agent that adjusts the pH of the exothermic reaction components, for example, an acid; or by placing the exothermic reaction components in an environment with a pH surpassing the requisite reaction threshold. Any volume and/or molarity of acid may be used provided the amount is sufficient to lower the pH of the fluid in the formation to the requisite degree.

In an example method, the acid may be pumped to the target formation in a first treatment fluid. An optional spacer fluid comprising water, or any other type of fluid sufficient for displacement, may be pumped into the formation to separate at least a portion of the acid from at least a portion of the exothermic reaction components which may be pumped in a subsequent treatment fluid. This separation may be done so as to prevent prematurely reacting the exothermic reaction components. If no separation is performed, the exothermic reaction components may contact at least a portion of the acid in the conduits and/or equipment use to convey the exothermic reaction components to the target area. This contact could induce the exothermic reaction components to react and thus induce the aforementioned portion of the acid present in the conduit and/or equipment to corrode the conduit and/or equipment. Further, the heat will dissipate prematurely and thus reduce acidizing efficiency. In examples in which corrosion is not an issue, there may be no need to separate the acid from the exothermic reaction components and the two may be pumped sequentially in treatment fluids or may be pumped to the target location in the same treatment fluid.

Continuing with the previous example, after the spacer fluid has been pumped, the exothermic reaction components may then be pumped in a second treatment fluid into the formation until they are placed into the target area. The exothermic reaction components may then react to heat the formation. A second spacer fluid (which may be the same or different from the first spacer fluid) may be pumped behind the exothermic reaction components. Then a third treatment fluid comprising the same acid or a different acid may be pumped to the target area of the formation. The acids present in the target area may have a relatively higher rate of acidization because the target formation will have a higher temperature due to the exotherm from the exothermic reaction.

Examples of suitable spacer fluids and/or materials may include, but should not be limited to poly saccharides such as dextran, cellulose, guar, chitin, chitosan, aliphatic poly esters, poly lactide, poly glycolide, poly caprolactone, poly hydroxyl butyrate, poly anhydrides, aliphatic poly carbonates, poly ortho esters, poly amino acids, poly ethylene oxide etc. Fatty alcohols selected from cholesterol, cholesteryl nonanoate, glyceraldehyde triphenyl methanol, dimethyl terephthalate, and the like. With the benefit of this disclosure, one of ordinary skill in the art will be able to separate the exothermic reaction components from the acid.

In alternative examples, one of the exothermic reaction components (e.g., the sodium nitrite or the ammonium chloride) may be pumped to the target area of the formation in a first treatment fluid. Then an optional spacer fluid may be pumped to separate the prior pumped exothermic reaction component from any subsequently pumped fluids. Finally, a second treatment fluid comprising a volume of acid and the remaining exothermic reaction component(s) may be pumped to the target formation. The exothermic reaction may be induced by the acid lowering the pH of the target formation, and the exotherm generated by the exothermic reaction may increase the rate of acidization of the formation.

In further alternative embodiments, the second exothermic reaction reactant which, as noted above, is pumped in a second treatment fluid with a volume of acid, may be encapsulated with an encapsulation material. The encapsulation material may slowly release the subsequent exothermic reaction component into the formation to react with the prior pumped exothermic reaction component in order to heat the formation and increase the rate of acidization.

Various types of encapsulation techniques may be used to encapsulate any of the exothermic reaction components including, but not limited to, matrix encapsulation, spray-drying, pan coating, centrifugal extrusion, air-suspension coating, vibrational nozzle encapsulation, and the like. A specific example may comprise adding molten encapsulation materials (e.g., wax) to the exothermic reaction component in a blender and then blending the mixture while maintaining a temperature above the melting point of the encapsulation material. The mixture should be blended until a homogenous mixture is formed. The encapsulation material may be at least partially coated on the exothermic reaction component. Further, the encapsulation material may completely coat the exothermic reaction component. Even further, the encapsulation material may both partially and completely coat the exothermic reaction component.

Suitable encapsulation materials may comprise relatively inert materials that do not react or otherwise negatively interfere with other components of the treatment fluids or the formation. In some examples, the encapsulation materials may be inert to the chemical and physical properties of the treatment fluids and the formation.

The encapsulation materials may comprise any material capable of encapsulating a exothermic reaction component. Example encapsulation materials may generally comprise clay, silica, polymers, etc. Specific examples may comprise water-insoluble polymers such as acrylic acid cross-linked with polyalkenyl ethers or divinyl glycol and waxes such as polyethylene wax, stearamide wax, paraffin wax, and the like. A commercial example of a suitable encapsulation material is the CARBOPOL® family of polymers, a registered trademark of Noveon, Inc. Another commercial example of an encapsulation material is BW-436 paraffin wax, available from Blended Waxes, Inc. of Oshkosh, Wis. Further materials may include, but should not be limited to: micro-particles or nano-particles such as poly(lactide-co-glycolide), poly(L-lactic acid), poly(D,L-lactic acid), polyglycolic acid, polyanhydrides, poly(ortho ethers), poly(ε-caprolactone), poly(hydroxy butyrate), poly(propylene fumarate), polyphosphoesters, polyphosphazenes, collagen, gelatin, carbohydrates, and the like. In some examples, a first encapsulating material may release a set of exothermic reaction components (e.g., sodium nitrite and ammonium chloride) which may react and then raise the temperature of the formation. When the temperature is raised, a second encapsulation material may release an additional set of exothermic reaction components to release additional heat in a later stage. The first and second encapsulation materials may comprise different materials or different chemical compositions; or they may comprise the same chemical composition but with a different pore sizes, for example, the first encapsulation material may have comparatively bigger pores to release the exothermic reaction components faster than the second encapsulation material. Further a combination of materials may be used to control the release of the exothermic reaction components in stages. Additionally, the melting point of the encapsulation material may be a factor for consideration in choosing an encapsulation material. As described above, melting or dissolving an encapsulation material, for example a first encapsulation material, may be important for reaching a temperature necessary to surpass the melting point of any additional encapsulation materials, for example, a second encapsulation material. The melting point may, in some instances, determine the rate of release of the exothermic reaction component from the encapsulation material. Additional melting point considerations may include storage of the exothermic reaction reactants in high-heat environments, wherein it may be advantageous to select encapsulation materials that can be stored on site without melting and/or compaction.

The amount of the encapsulation material used may generally depend on a number of factors. The factors may include the particular exothermic reaction component, the specific encapsulation material, the encapsulation technique desired, the melting point of the encapsulation material, and the total cost, amongst others factors. The encapsulation material may be present in an amount of about 0.1% to about 50% by weight of the encapsulated exothermic reaction component. For example, the encapsulation material may be present in an amount of about 0.1%, about 2.5%, about 5%, about 10%, about 20%, about 30%, about 40%, or about 50% by weight of the encapsulated exothermic reaction component.

The treatments fluids and optional spacer fluids may comprise an aqueous component. The aqueous component may be from any source provided that it does not contain an excess of compounds that may undesirably affect other components in the treatment fluid. The aqueous component may comprise fresh water or salt water. Salt water generally may include one or more dissolved salts therein and may be saturated or unsaturated as desired for a particular application. Seawater or brines may be suitable for use in some applications. The amount of the aqueous component may typically be dictated by the final concentration of acid desired. With the benefit of this disclosure one of ordinary skill in the art should recognize the appropriate type and amount of the aqueous component for a chosen application.

Lost-circulation materials may be included in the treatment fluids to, for example, help prevent the loss of fluid circulation into the subterranean formation. Examples of lost-circulation materials include, but are not limited to, graphite, nut shells, calcium carbonate, and the like. Further examples of lost-circulation materials may include various types of fibers including natural or synthetic fibers. For example, the lost-circulation fiber types may include natural, biopolymers, synthetic, biodegradable, and/or biocompatible fibers. Examples of synthetic fibers may include, but are not limited to, polymers composed of polypropylene, polyaramide, polyester, polyacrylonitrile, and polyvinyl alcohol. Examples of biodegradable fibers may include, but are not limited to, fibers composed of modified cellulose, chitosan, soya, modified chitosan, polycaprolactone, poly(3-hydroxybutyrate), polyhydroxy-alkanoates, polyglycolic acid "PGA", polylactic acid "PLA", polyorthoesters, polycarbonates, polyaspartic acid, polyphosphoesters, or copolymers thereof. Examples of other suitable fibers may include, but are not limited to fibers of cellulose including viscose cellulosic fibers, oil coated cellulosic fibers, and fibers derived from a plant product like paper fibers; carbon including carbon fibers; melt-processed inorganic fibers including basalt fibers, wollastonite fibers, non-amorphous metallic fibers, ceramic fibers, and glass fibers. The lost-circulation materials may be present in the treatment fluids in an amount in the range of from about 0% to about 20% by weight of the treatment fluid. More particularly, the lost-circulation materials may be present in an amount ranging between any of and/or including any of about 0%, about 0.1%, about 1%, about 2%, about 4%, about 6%, about 8%, about 10%, or about 20% by weight of the treatment fluid. One of ordinary skill in the art, with the benefit of this disclosure, should recognize the appropriate type and amount of lost circulation material to include for a chosen application.

A method for acidizing a subterranean formation may be provided. The method may include one or all of the components illustrated on FIGS. 1-2. The method may comprise using an acid to lower the pH of a fluid within a subterranean formation; reacting exothermic reaction components in the fluid within the subterranean formation to heat the subterranean formation; and acidizing the subterranean formation. The acid may be selected from the group consisting of hydrochloric acid, hydrofluoric acid, formic acid, lactic acid, phosphoric acid, sulfamic acid, acetic acid, esters of acids, acid sources, derivatives thereof, and mixtures thereof. The exothermic reaction components may comprise sodium nitrite and ammonium chloride. One of the exothermic reaction components may be encapsulated with an encapsulation material. The encapsulation material may be selected from the group consisting of a clay, a silica, a polymer, a wax, a gelatin, a collagen, a carbohydrate, and a combination thereof. The subterranean formation has a temperature less than 200° F. prior to the step of reacting.

A method for acidizing a subterranean formation may be provided. The method may include one or all of the components illustrated on FIGS. 1-2. The method may comprise introducing a first acidic treatment fluid into the subterranean formation; introducing a treatment fluid comprising exothermic reaction components into the subterranean formation, wherein the exothermic reaction components react in an exothermic reaction at a specific pH; and introducing a second acidic treatment fluid into the subterranean formation. The first acidic treatment fluid and the second acidic treatment may each individually comprise an acid selected from the group consisting of hydrochloric acid, hydrofluoric acid, formic acid, lactic acid, phosphoric acid, sulfamic acid, acetic acid, esters of acids, acid sources, derivatives thereof, and mixtures thereof. The exothermic reaction components comprise sodium nitrite and ammonium chloride. A spacer fluid may be introduced into the subterranean formation prior to the introduction of the treatment fluid. A portion of the exothermic reaction components may be encapsulated in a first encapsulation material, and wherein another portion of the exothermic reaction components are encapsulated in a second encapsulate material. The first acidic treatment fluid may comprise a first acid in an amount of from about 10% to about 20% by volume of the first treatment fluid, and wherein the second treatment fluid comprises a second acid in an amount of from about 1% to about 35% by volume of the second treatment fluid, wherein the first acid and the second acid may the same or different acids. The subterranean formation has a temperature less than 200° F. prior to the step of reacting.

A method for acidizing a subterranean formation may be provided. The method may include one or all of the components illustrated on FIGS. 1-2. The method may comprise introducing a first treatment fluid comprising a first exothermic reaction component into the subterranean formation; and introducing a second treatment fluid comprising an acid and a second exothermic reaction component into the subterranean formation, wherein the first exothermic reaction component and the second exothermic reaction component react in an exothermic reaction at a specific pH. The first exothermic reaction component may comprise sodium nitrite and the second exothermic reaction component may comprise ammonium chloride. The first exothermic reaction component may comprise ammonium chloride and the second exothermic reaction component may comprise sodium nitrite. The acid may be selected from the group consisting of hydrochloric acid, hydrofluoric acid, formic acid, lactic acid, phosphoric acid, sulfamic acid, acetic acid, esters of acids, acid sources, derivatives thereof, and mixtures thereof. The subterranean formation has a temperature less than 200° F. The acid may be present in the second treatment fluid in an amount of from about 1% to about 35% by volume of the second treatment fluid. The second exothermic reaction component may be encapsulated with an encapsulation material. The encapsulation material may be selected from the group consisting of a clay, a silica, a polymer, a wax, a gelatin, a collagen, a carbohydrate, and a combination thereof.

Figure 1:
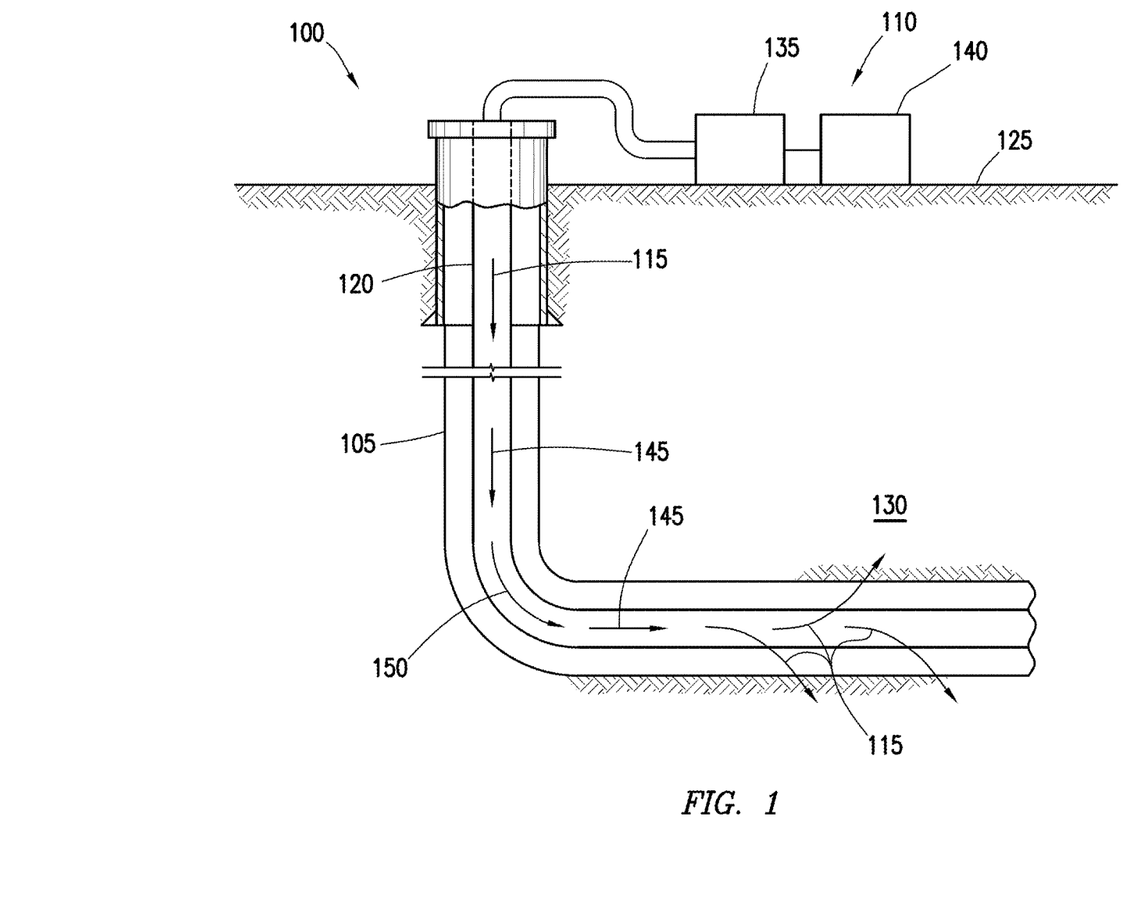
FIG. 1 illustrates an example system for delivery of treatments fluids into a wellbore.

Turning now to FIG. 1, an example well system 100 for introduction of treatment fluids described herein into a wellbore 105 is shown. As depicted in FIG. 1, system 100 may include a fluid handling system 110 for introducing an acidic treatment fluid 115 into the wellbore by way of tubular 120. Acidic treatment fluid 115 comprises any acid of the acids disclosed herein in any desirable volume and molarity. In the illustrated embodiment, the fluid handling system 110 is above the surface 125 while wellbore 105 and tubular 120 are below the surface 125. The fluid handling system 110 can be configured as shown in FIG. 1 or in a different manner, and may include additional or different features as appropriate. The fluid handling system 110 may be deployed via skid equipment, marine vessel deployed or may be comprised of sub-sea deployed equipment.

As illustrated in FIG. 1, wellbore 105 may include vertical and horizontal sections, and an acidic treatment fluid 115 may be introduced into subterranean formation 130 surrounding the horizontal portion of the wellbore 105. Generally, a wellbore 105 may include horizontal, vertical, slant, curved, and other types of wellbore geometries and orientations, and the acidic treatment fluid 115 may generally be applied to subterranean formation 130 surrounding any portion of wellbore 105. Wellbore 105 may include a casing that is cemented or otherwise secured to the wellbore wall. Wellbore 105 can be uncased or include uncased sections. Perforations can be formed in the casing to allow treatment fluids and/or other materials to flow into subterranean formation 130. Perforations can be formed using shape charges, a perforating gun, and/or other tools.

Fluid handling system 110 may include mobile vehicles, immobile installations, skids, hoses, tubes, fluid tanks or reservoirs, pumps, valves, and/or other suitable structures and equipment. For example, the fluid handling system 110 may include pumping equipment 135 and a fluid supply 140, which both may be in fluid communication with the tubular 120. The fluid supply 140 may contain the acidic treatment fluid 115. The pumping equipment 135 may be used to supply treatment fluid 115 from the fluid supply 140, which may include tank, reservoir, connections to external fluid supplies, and/or other suitable structures and equipment. Pumping equipment 135 may be coupled to tubular 120 to communicate treatment fluid 115 into wellbore 105. Fluid handling system 110 may also include surface and downhole sensors (not shown) to measure pressure, rate, temperature and/or other parameters of treatment. Fluid handling system 110 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment.

The tubular 120 may include coiled tubing, sectioned pipe, and/or other structures that communicate fluid through wellbore 105. Alternatively, tubular may include casing, liners, or other tubular structures disposed in wellbore 105. Tubular 120 may include flow control devices, bypass valves, ports, and or other tools or well devices that control a flow of fluid from the interior of tubular 120 into subterranean formation 130. For example, tubular 120 may include ports to communicate acidic treatment fluid 115 directly into the rock matrix of the subterranean formation 130. Although FIG. 1 shows the horizontal section of the tubular 120 representing an inner tubular structure of well system 100, in some embodiments, such inner tubular structure may be absent.

With continued reference to FIG. 1, well system 100 may be used for delivery of the acidic treatment fluid 115 into wellbore 105. The acidic treatment fluid 115 may be pumped from fluid supply 140 down the interior of tubular 120 in wellbore 105. The acidic treatment fluid 115 may be allowed to flow down the interior of tubular 120, exit the tubular 120, and finally enter subterranean formation 130 surrounding wellbore 105. The acidic treatment fluid 130 may dissolve acid soluble portions of subterranean formation 130 and lower the pH of the subterranean formation 130 in the targeted area. The acidic treatment fluid 115 may also enter subterranean formation 130 at a sufficient pressure to cause fracturing of subterranean formation 130 in applications utilizing acidic fracturing.

In the example of FIG. 1, subsequent to the delivery of acidic treatment fluid 115 into the wellbore by well system 100, spacer fluid 145 may be introduced by well system 100 into tubular 120 to separate the exothermic reaction treatment fluid 150 from acidic treatment fluid 115 and thus minimize the potential for corrosion in tubular 120. As discussed, after pumping of the spacer fluid 145 through tubular 120, a exothermic reaction treatment fluid 150 comprising exothermic reaction components may be delivered into wellbore 105 by well system 100 and pumped to the targeted area of the subterranean formation 130. When the exothermic reaction treatment fluid 150 reaches the target area of subterranean formation 130, the lowered pH in the target area of subterranean formation 130 induces the exothermic reaction components within exothermic reaction treatment fluid 150 to react. The exothermic reaction of the exothermic reaction components may increase the temperature of the subterranean formation 130 and thus, may also increase the reaction rate of any acidization reaction and thus enhance stimulation of the targeted area of subterranean formation 130.

With continued reference to FIG. 1, a second spacer fluid 145 may be introduced by well system 100 into tubular 120 to separate the exothermic reaction treatment fluid 150 from a subsequent acidic treatment fluid 115 and thus minimize the potential for corrosion in tubular 120. Finally, another acidic treatment fluid 115 may be introduced into wellbore 105 via delivery by well system 100. The acidic treatment fluid 115 may be pumped from fluid supply 140 down the interior of tubular 120 in wellbore 105. The acidic treatment fluid 115 may be allowed to flow down the interior of tubular 120, exit the tubular 120, and finally enter subterranean formation 130 surrounding wellbore 105. The acidic treatment fluid 130 may dissolve acid soluble portions of subterranean formation 130 at an increased rate due to the temperature increase induced by the exotherm from the prior pumped exothermic reaction treatment fluid 150.

Figure 2:
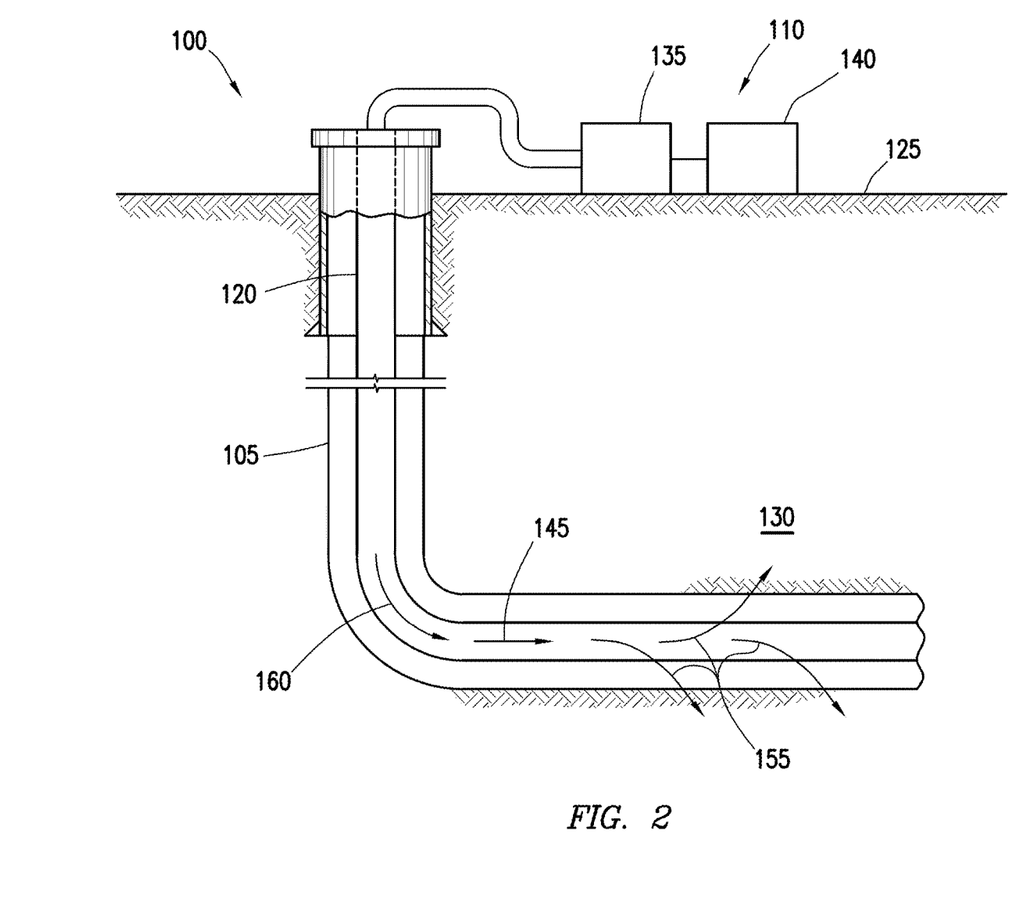
FIG. 2 illustrates another example system for delivery of treatments fluids into a wellbore.

FIG. 2 illustrates the same well system 100 as FIG. 1, however, the schedule of treatment fluids and/or the composition of the treatment fluids has been altered. In FIG. 2, a first treatment fluid 155 comprising one exothermic reaction component may be delivered into wellbore 105 via well system 100. The first treatment fluid 155 may be pumped from fluid supply 140 down the interior of tubular 120 in wellbore 105. The first treatment fluid 155 may be allowed to flow down the interior of tubular 120, exit the tubular 120, and finally enter subterranean formation 130 surrounding wellbore 105. Spacer fluid 145 may be introduced by well system 100 into tubular 120 to separate the first treatment fluid 155 from a second treatment fluid 160 and thus minimize the potential for corrosion in tubular 120.

As discussed, after pumping of the spacer fluid 145 through tubular 120, a second treatment fluid 160 comprising the remaining exothermic reaction component(s) and at least one acid may be delivered into wellbore 105 by well system 100 and pumped to the targeted area of the subterranean formation 130 via tubular 120. When the second treatment fluid 160 reaches the target area of the subterranean formation 130, the acid within the second treatment fluid 150 may raise the pH of the target area of the subterranean formation 130 which now contains the exothermic reaction components introduced via the first treatment fluid 155 and the second treatment fluid 160. When the pH of the targeted area of the subterranean formation 130 reaches a threshold for reaction of the exothermic reaction components, the exothermic reaction components react in an exothermic reaction to generate a large exotherm which may increase the temperature of the targeted area of the subterranean formation 130. This induced temperature increase may increase the reaction rate of the acidization reaction within the targeted area of the subterranean formation 130 and thus enhance stimulation of the targeted area of subterranean formation 130.

In an alternative example, the second treatment fluid 160 of FIG. 2 may comprise an encapsulated exothermic reaction component(s) that may slowly release over time or as the acid dissolves the encapsulation, such that the exothermic reaction is delayed until the exothermic reaction component of the second treatment fluid 160 is released to react with the exothermic reaction component of the first treatment fluid 155.

It is to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in the preceding figures.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of acidizing of subterranean formations in well operations comprising:
   first, introducing an acidic treatment fluid into a subterranean formation, the acidic treatment fluid comprising an acid, and lowering a pH of a fluid within the subterranean formation to about 4 or less;
   second, introducing a spacer fluid into the subterranean formation;
   third, introducing a second treatment fluid comprising exothermic reaction components comprising sodium nitrite and ammonium chloride into the subterranean formation;
   contacting the exothermic reaction components with the fluid within the subterranean formation;
   reacting the exothermic reaction components in the fluid within the subterranean formation to heat the subterranean formation from a temperature below about 200° F. to above about 200° F. such that acidization of the subterranean formation is accelerated; and
   matrix acidizing the subterranean formation.

2. The method of claim 1, wherein the acid is selected from the group consisting of hydrochloric acid, hydrofluoric acid, formic acid, lactic acid, phosphoric acid, sulfamic acid, acetic acid, esters of acids, acid sources, derivatives thereof, and mixtures thereof.

3. The method of claim 1, wherein one of the exothermic reaction components is encapsulated with an encapsulation material.

4. The method of claim 3, wherein the encapsulation material is selected from the group consisting of a clay, a silica, a polymer, a wax, a gelatin, a collagen, a carbohydrate, and a combination thereof.

5. A method of acidizing a subterranean formation comprising:
   introducing a first acidic treatment fluid into the subterranean formation;
   introducing a spacer fluid into the subterranean formation after introducing the first acidic treatment fluid:
   introducing a treatment fluid comprising exothermic reaction components into the subterranean formation after introducing the spacer fluid, wherein the exothermic reaction components react in an exothermic reaction at a specific pH of about 4 or less, wherein the spacer fluid is pumped between the first acidic treatment fluid and the treatment fluid to prevent premature contact between the first acidic treatment fluid and the treatment fluid;
   reacting the exothermic reaction components in the exothermic reaction at the specific pH to heat the subterranean formation to a temperature above 200° F. to accelerate subsequent acidizing, wherein the treatment fluid and the first acidic treatment fluid contact one another in the subterranean formation with the first acidic treatment fluid providing the specific pH to induce the exothermic reaction and
   introducing a second acidic treatment fluid into the subterranean formation that has been heated by the exothermic reaction such that acidization of the subterranean formation by the second acidic treatment fluid is accelerated.

6. The method of claim 5, wherein the first acidic treatment fluid and the second acidic treatment each individually comprise an acid selected from the group consisting of hydrochloric acid, hydrofluoric acid, formic acid, lactic acid, phosphoric acid, sulfamic acid, acetic acid, esters of acids, acid sources, derivatives thereof, and mixtures thereof.

7. The method of claim 5, wherein the exothermic reaction components comprise sodium nitrite and ammonium chloride.

8. The method of claim 5, wherein a portion of the exothermic reaction components are encapsulated in a first encapsulation material, and wherein another portion of the exothermic reaction components are encapsulated in a second encapsulation material.

9. The method of claim 5, wherein the first acidic treatment fluid comprises a first acid in an amount of from about 10% to about 20% by volume of the first acidic treatment fluid, and wherein the second acidic treatment fluid comprises a second acid in an amount of from about 1% to about 35% by volume of the second acidic treatment fluid, wherein the first acid and the second acid are the same or different acids.

10. A method of matrix acidizing a subterranean formation comprising:
introducing a first treatment fluid comprising a first exothermic reaction component into the subterranean formation at a rate and pressure below a fracturing pressure of the subterranean formation;
introducing a spacer fluid into the subterranean formation after introducing the first treatment fluid:
introducing a second treatment fluid comprising an acid and a second exothermic reaction component into the subterranean formation, after introducing the spacer fluid, at a rate and pressure below the fracturing pressure of the subterranean formation, wherein the first exothermic reaction component and the second exothermic reaction component react in an exothermic reaction at a specific pH of about 4 or less, with the acid providing the specific pH to induce the exothermic reaction;
heating the subterranean formation by the exothermic reaction to a temperature above 200° F.; and
matrix acidizing the subterranean formation that has been heated by the exothermic reaction, such that the matrix acidizing is accelerated.

11. The method of claim 10, wherein the first exothermic reaction component comprises sodium nitrite and the second exothermic reaction component comprises ammonium chloride.

12. The method of claim 10, wherein the first exothermic reaction component comprises ammonium chloride and the second exothermic reaction component comprises sodium nitrite.

13. The method of claim 10, wherein the acid is selected from the group consisting of hydrochloric acid, hydrofluoric acid, formic acid, lactic acid, phosphoric acid, sulfamic acid, acetic acid, esters of acids, acid sources, derivatives thereof, and mixtures thereof.

14. The method of claim 10, wherein the subterranean formation has a temperature less than 200° F. prior to the exothermic reaction.

15. The method of claim 10, wherein the acid is present in the second treatment fluid in an amount of from about 1% to about 35% by volume of the second treatment fluid.

16. The method of claim 10, wherein the second exothermic reaction component is encapsulated with an encapsulation material.

17. The method of claim 16, wherein the encapsulation material is selected from the group consisting of a clay, a silica, a polymer, a wax, a gelatin, a collagen, a carbohydrate, and a combination thereof.

* * * * *